United States Patent
Watanabe

(10) Patent No.: US 10,606,523 B2
(45) Date of Patent: Mar. 31, 2020

(54) PRINTER AND A NON-TRANSITORY COMPUTER-READABLE RECORDING MEDIUM

(71) Applicant: SEIKO EPSON CORPORATION, Tokyo (JP)

(72) Inventor: Ikumi Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/287,513

(22) Filed: Feb. 27, 2019

(65) Prior Publication Data

US 2019/0272126 A1 Sep. 5, 2019

(30) Foreign Application Priority Data

Mar. 1, 2018 (JP) .................. 2018-036221

(51) Int. Cl.
    *G06F 3/12*      (2006.01)
    *G06K 15/00*      (2006.01)
    *G03G 15/00*      (2006.01)

(52) U.S. Cl.
    CPC ....... *G06F 3/1204* (2013.01); *G03G 15/5012* (2013.01); *G03G 15/5083* (2013.01); *G03G 15/6508* (2013.01); *G03G 15/6514* (2013.01); *G06F 3/12* (2013.01); *G06F 3/1276* (2013.01); *G06F 3/1284* (2013.01); *G06F 3/1297* (2013.01); *G06K 15/4025* (2013.01)

(58) Field of Classification Search
    CPC .... G06F 3/1204; G06F 3/1276; G06F 3/1284; G06F 3/1297; G06F 3/12; G06K 15/4025; G03G 15/6514; G03G 15/5012; G03G 15/5083; G03G 15/6508
    See application file for complete search history.

(56) References Cited

U.S. PATENT DOCUMENTS

| | | | |
|---|---|---|---|
| 4,685,797 A | 8/1987 | Ito | |
| 2004/0184058 A1* | 9/2004 | Miyajima | B41J 11/003 358/1.12 |
| 2006/0180975 A1* | 8/2006 | Yako | B41J 11/0095 271/9.01 |
| 2006/0275070 A1 | 12/2006 | Shimizu | |
| 2007/0071477 A1* | 3/2007 | Tanaka | G03G 15/6508 399/82 |

(Continued)

FOREIGN PATENT DOCUMENTS

| | | |
|---|---|---|
| JP | H11-189344 | 7/1999 |
| JP | H11189344 | 7/1999 |
| JP | 2007-018502 A | 1/2007 |

OTHER PUBLICATIONS

European Search Report issued in Application No. EP19159598 dated Jul. 10, 2019.
European Search Report for EP19159598.2 dated Jul. 23, 2019.

*Primary Examiner* — Moustapha Diaby
(74) *Attorney, Agent, or Firm* — Workman Nydegger

(57) ABSTRACT

A printer having a single-sheet manual feed tray improves user convenience. A printer configured to print based on print request data has a manual paper feeder in which only one sheet of print media can be loaded at one time; another paper feeder in which multiple sheets of print media can be loaded at one time; and a manual feeder priority function that prioritizes using the manual paper feeder over the other paper feeder when automatic paper feeder selection is specified in the print request data.

10 Claims, 2 Drawing Sheets

(56) References Cited

U.S. PATENT DOCUMENTS

2009/0189330 A1\* 7/2009 Saito .................. B65H 3/44
                                                                         271/9.05
2013/0148144 A1   6/2013 Tao
2018/0107146 A1\* 4/2018 Shinohara ........ G03G 15/5029

\* cited by examiner

PRINTER AND A NON-TRANSITORY COMPUTER-READABLE RECORDING MEDIUM

BACKGROUND

1. Technical Field

The present invention relates to a printer.

2. Related Art

Some printers have a manual feed tray for manually inserting single sheets of paper to the printer. See, for example, JP-A-2007-18502, which describes a printer that is normally used to print small print jobs using various types of print media.

Because the medium loaded into the manual feed tray may be different every time a sheet is loaded, the operation for telling the printer what type of paper that is loaded in the manual feed tray quickly becomes tedious. The type of medium loaded in the manual feed tray is therefore not normally set. As a result, even if the print request data includes a command to automatically select the paper feed tray, the manual feed tray is not included in the choices for automatic paper feed tray selection because whether or not the paper set in the manual feed tray matches the paper type in the print request cannot be determined.

When printing using the manual feed tray, conventional devices therefore issue a print request after the user performs an operation setting the paper feeder to the manual feed tray through the printer driver on the device issuing the print request.

Printers with a manual feed tray such as described above are not used only for printing small print jobs on various types of paper, and because they are typically small and enable easily loading the print media, are also used as passbook printers for updating passbooks, a frequent task at teller windows in banks, for example.

When printing passbooks using the manual feed tray in this type of work environment, the time-consuming operation of telling the paper feeder to use the manual feed tray must be performed for every printing operation.

A printer that is easy to use in various work environments is therefore needed.

SUMMARY

An object of the present invention is to provide a printer that has a manual feed tray and improves user convenience.

To achieve the foregoing objective, one aspect of the invention is a printer configured to print based on print request data, including: a manual paper feeder in which only one sheet of print media can be loaded at one time; another paper feeder in which multiple sheets of print media can be loaded at one time; and a manual feeder priority function that prioritizes using the manual paper feeder over the other paper feeder when automatic paper feeder selection is specified in the print request data.

With this configuration, there is no need to set (specify) the paper feeder every time the manual paper feeder is used in a work environment where the manual paper feeder is frequently used, thereby improving user convenience.

A printer according to another aspect of the invention also has a sensor configured to detect presence of paper in the manual paper feeder; and when automatic paper feeder selection is specified in the print request data, the manual feeder priority function determines whether or not paper is in the manual paper feeder based on a detection result of the sensor, and if paper is detected, supplies paper from the manual paper feeder for printing.

In a printer according to another aspect of the invention, when the manual feeder priority function determines whether or not paper is in the manual paper feeder based on the detection result of the sensor, and determines there is no paper, the manual feeder priority function supplies paper for printing from another paper feeder in which paper matching the print request data is set.

This configuration automatically supplies paper from the appropriate paper feeder even when there is no paper in the manual paper feeder, thereby improving user convenience.

In a printer according to another aspect of the invention, when paper is not set in the manual paper feeder, and paper matching the print request data is not set in another paper feeder, the manual feeder priority function prompts selecting the manual paper feeder or another paper feeder.

When there is not a paper feeder holding the appropriate paper, this configuration issues a report prompting selecting a paper feeder, thereby improving user convenience.

In a printer according to another aspect of the invention, when the manual paper feeder runs out of paper while executing a print job supplying paper from the manual paper feeder, the manual feeder priority function prompts setting paper in the manual paper feeder, and does not execute the print job by supplying paper from another paper feeder.

This configuration improves user convenience by issuing a report prompting adding paper to the manual paper feeder.

In a printer according to another aspect of the invention, the another paper feeder includes multiple paper feeders; and when the paper feeder runs out of paper while executing a print job supplying paper from one of the multiple other paper feeders, the manual feeder priority function executes the print job by supplying paper from one of the multiple other paper feeders that holds paper matching the print request data and is not the paper feeder that ran out of paper.

User convenience is great with this configuration because paper is supplied from another suitable paper feeder when the paper feeder being used runs out of paper.

In a printer according to another aspect of the invention, the manual feeder priority function can be set to enabled and disabled.

This configuration enables configuring the manual feeder priority function appropriately to the work environment, further improving user convenience.

In a printer according to another aspect of the invention, when the manual feeder priority function is enabled, whether or not to use the manual feeder priority function is determined based on a type of print job specified by the print request data.

This configuration enables using the manual feeder priority function appropriately according to the print job.

In a printer according to another aspect of the invention, the manual feeder priority function is used when the print job is in response to a request from an external device, and the manual feeder priority function is not used when the print job is printing a facsimile or printing a status report.

To achieve the foregoing objective, another aspect of the invention is a program causing a controller of a printer configured to print based on print request data, and having a manual paper feeder in which only one sheet of print media can be loaded at one time, and another paper feeder in which multiple sheets of print media can be loaded at one time, to execute a process of: prioritizing using the manual paper feeder over the other paper feeder when automatic paper feeder selection is specified in the print request data.

Other objects and attainments together with a fuller understanding of the invention will become apparent and appreciated by referring to the following description and claims taken in conjunction with the accompanying drawings.

DESCRIPTION OF EMBODIMENTS

Figure 1:
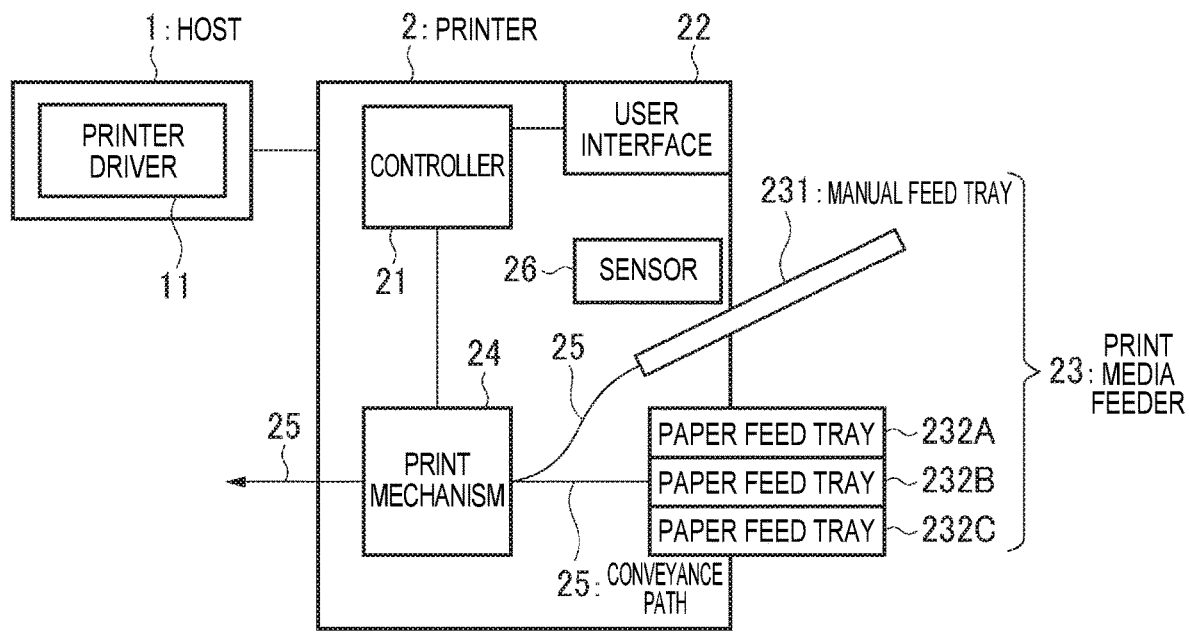
FIG. 1 illustrates the configuration of a printer according to the invention.

An embodiment of the present invention is described below with reference to the accompanying figures. However, the embodiment described below does not limit the technical scope of the invention. Note that in the figures like or similar parts are identified by the same reference numerals or reference symbols.

FIG. 1 illustrates the configuration of a printer according to the invention.

The printer 2 shown in FIG. 1 is an example of a printer according to the invention, and this printer 2 has a print media feeder 23 including a manual feed tray 231, and a manual feeder priority function that prioritizes using the manual feed tray 231 when a print request specifying automatically selecting the paper feeder is received. As a result, user convenience can be improved in an environment where the manual feed tray 231 is frequently used.

The printer 2 in this embodiment of the invention is an inkjet printer also having a photocopier function and a fax machine function, for example.

The host 1 shown in FIG. 1 is a host computer that outputs print requests to the printer 2, and in this example is a personal computer.

The host 1 also has a printer driver 11. The printer driver 11 is a driver for the printer 2, and is embodied by a driver program, CPU, and RAM, for example.

When the host 1 sends a print request to the printer 2, the printer driver 11 generates print request data, and the print request data is sent to the printer 2. The print request data includes the image data to be printed, and commands specifying the printing conditions.

The printing conditions include the print media feeder 23 of the printer 2, and the print request data includes a command specifying a specific print media feeder 23. This command is an automatic paper feeder selection command instructing automatically selecting the print media feeder 23 that supplies paper matching the other printer conditions, and this command is selected by default when generating a print request.

As shown in FIG. 1, the printer 2 has a controller 21, user interface 22, print media feeder 23, print mechanism 24, conveyance path 25, and sensor 26.

The controller 21 is a controller that controls operation of parts of the printer 2, and is embodied by a CPU, RAM, ROM, ASIC, or other devices not shown. When print request data is received from a host 1, for example, the controller 21 interprets the print request data and executes the requested printing operation. The printing process includes a process of determining which print media feeder 23 to supply print media from, and the printer 2 of the invention is characterized by this process. This process is executed using a program specifying the process steps, and a CPU or other device that operates according to the program.

The user interface 22 controls interfacing with the user of the printer 2, and includes a display panel and operating panel, for example. Using the user interface 22, the user can enable or disable (turn on or off) the manual feeder priority function described above. Note that various settings, including this setting, are stored in NVRAM, for example, of the controller 21.

The print media feeder 23 is a device that supplies paper, which is the print medium the printer 2 prints on in this example, and includes a manual feed tray 231 (manual paper feeder) to which a single sheet of print medium can be inserted, and one or more paper feed trays 232 (other paper feeders) in which multiple sheets of print media can be loaded.

The manual feed tray 231 can accommodate (hold) various types of print media, including passbooks, but can only hold one print medium at a time. Therefore, when printing with print media fed from the manual feed tray 231, the user must load the print media one at a time to the manual feed tray 231.

In this example, there are three paper feed trays 232, identified as paper feed trays 232A, 232B, 232C. Each of these paper feed trays can hold (supply) multiple sheets of print media, typically standard paper sizes such as A4 and A3 printing paper, for example.

The printer 2 also has a conveyance path 25 that conveys the paper supplied from the print media feeder 23.

The printer 2 also has a sensor 26 that detects whether or not print media is set (whether or not paper is present) in the manual feed tray 231. The sensor 26 may be disposed to the manual feed tray 231 and configured to detect paper set in the manual feed tray 231, or disposed to the conveyance path 25 and detect paper supplied from the manual feed tray 231.

While not shown in the figure, there are also sensors configured to detect whether or not paper is loaded in the paper feed trays 232. The sensor 26 and sensors for the paper feed trays 232 may be mechanical sensor or optical sensors, for example.

The print mechanism 24 is the part that executes the printing process according to the commands from the controller 21. The print mechanism 24 includes a conveyance mechanism configured to convey the paper supplied through the conveyance path 25 to the printing position and discharge the paper after printing, and a printhead for printing on the conveyed paper.

The conveyance mechanism in this example has a pair of top and bottom conveyance rollers that hold and move the paper on the conveyance path 25, and a conveyance roller motor and power transfer mechanism.

The printhead has multiple nozzles for ejecting ink, is mounted on a carriage, and moves along the main scanning direction (a direction perpendicular to the conveyance direction of the paper).

The printer 2 according to this embodiment configured as described above is characterized by a manual feeder priority function that prioritizes using the manual feed tray 231 when a print request specifying automatic paper feeder selection is received. The process executed when the manual feeder priority function is enabled (on) is described below.

Note that as described above the user enables the manual feeder priority function through the user interface 22. This setting is stored in NVRAM, for example, of the controller 21.

Figure 2:
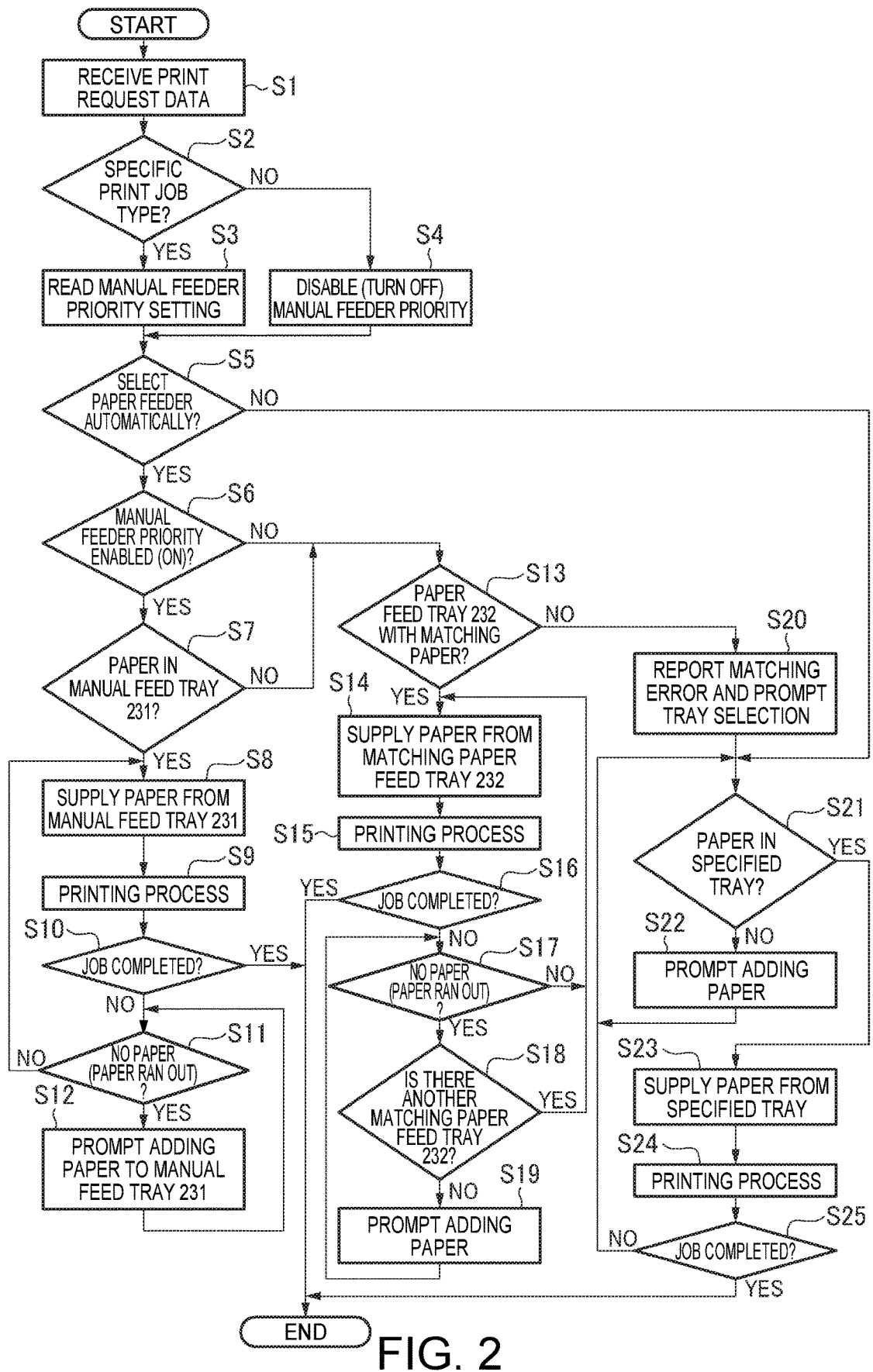
FIG. 2 is a flow chart showing an example of the operating process when a manual feeder priority function is enabled (turned on).

FIG. 2 is a flow chart of the process executed when the manual feeder priority function is enabled (on). The controller 21 of the printer 2 first receives print request data from the host 1 (step S1 in FIG. 2). Note that as described above the print request data includes a command specifying the paper feeder to use (including specifying automatic paper feeder selection).

Next, the controller 21 interprets the received print request data, and determines the type of print job requested (step S2 in FIG. 2). The types of print job in this example include print jobs requested from an external device such as the host 1, print jobs executed when a fax is received, print jobs for printing printer status reports, photocopier print jobs, and jobs for printing directly from a connected USB memory device, for example.

A status report is a sheet containing printer information and consumables information, for example. The printer information may include a device identifier, MAC address, and the types of paper (print media) set in the paper feed trays 232. The consumables information may include the colors and types of ink cartridges, and the model number of the maintenance box, for example.

In this determination process the controller 21 determines if the interpreted (received) print job is a specific type of print job, and more specifically in this embodiment determines if the print job was requested by an external device. If the received print object is the specific type of print job (step S2 in FIG. 2: Yes), the controller 21 reads the configuration settings of the enabled manual feeder priority function (step S3 in FIG. 2).

If the received print object is not the specific print job type (step S2 in FIG. 2: No), the controller 21 determines the manual feeder priority function is disabled for the process of the received print job (step S4 in FIG. 2). In other words, the controller 21 continues processing as though the manual feeder priority function is disabled (off).

Next, the controller 21 interprets the command specifying the paper feeder included in the received print request data, and determines if the automatic paper feeder selection is specified (step S5 in FIG. 2). If the decision is that automatic paper feeder selection is not specified (step S5 in FIG. 2: No), the process goes to step S21.

However, if the decision is that automatic paper feeder selection is specified (step S5 in FIG. 2: Yes), the controller 21 determines whether or not the manual feeder priority function is enabled (step S6 in FIG. 2). More specifically, the controller 21 determines whether the setting processed in step S3 or S4 is enabled or disabled.

If the manual feeder priority function is disabled (step S6 in FIG. 2: No), the process goes to step S13.

If the decision is that the manual feeder priority function is enabled (step S6 in FIG. 2: Yes), the controller 21 determines if there is paper in (if paper is set in) the manual feed tray 231 (step S7 in FIG. 2). More specifically, the controller 21 makes this decision based on the output of the sensor 26.

If the decision is there is no paper in the manual feed tray 231 (step 7 in FIG. 2: No), the process goes to step S13.

If the decision is there is paper in the manual feed tray 231 (step 7 in FIG. 2: Yes), the controller 21 executes the manual feeder priority process.

First, the controller 21 supplies paper from the manual feed tray 231 (step S8 in FIG. 2), controls the print mechanism 24 to convey the supplied paper to the printing position, executes the printing process (step S9 in FIG. 2), and then discharges the printed paper.

The controller 21 then determines if the print job was completed (step S10 in FIG. 2), and if the print job was completed (step S10 in FIG. 2: Yes), stops printing based on the received print request data.

If the print job is not completed (step S10 in FIG. 2: No), the controller 21 determines if the manual feed tray 231 ran out of paper, that is, determines whether or not paper is set in the manual feed tray 231 (step S11 in FIG. 2).

If the decision is there is no paper (step S11 in FIG. 2: Yes), the controller 21 prompts the user to set paper in the manual feed tray 231 (step S12 in FIG. 2). More specifically, the controller 21 displays on the display panel of the user interface 22 a message prompting setting paper in the manual feed tray 231. Processing then returns to step S11.

However, if the decision is that the manual feed tray 231 has not run out of paper (step S11 in FIG. 2: No), the process returns to step S8 and repeats until the job ends.

If the process goes to step S13, the controller 21 executes the process normally executed when automatic paper feeder selection is commanded.

In this process the controller 21 first determines if there is a paper feed tray 232 storing paper matching the print job (step S13 in FIG. 2). This decision is made using the paper feed tray 232A, 232B, 232C settings information (information indicating the type of paper that is loaded), and output of the sensors determining if paper is present.

If the decision is that no paper feed tray 232 stores the matching type of paper (step S13 in FIG. 2: No), the controller 21 reports a matching error and prompts the user to select a tray (step S20 in FIG. 2). Next, the process goes to step S21.

If the decision is that there is paper feed tray 232 storing the required type of paper (step S13 in FIG. 2: Yes), the controller 21 supplies paper from the paper feed tray 232 holding the required paper (step S14 in FIG. 2), controls the print mechanism. 24 to convey the supplied paper to the printing position, executes the printing process (step S15 in FIG. 2), and then discharges the printed paper.

The controller 21 then determines if the print job was completed (step S16 in FIG. 2), and if the print job was completed (step S16 in FIG. 2: Yes), stops printing based on the received print request data.

If the print job is not completed (step S16 in FIG. 2: No), the controller 21 determines if the paper feed tray 232 ran out of paper, that is, determines whether or not paper is set in the paper feed tray 232 (step S17 in FIG. 2).

If the decision is there is no paper (step S17 in FIG. 2: Yes), the controller 21 determines if there is another paper feed tray 232 holding paper matching the print job (step S18 in FIG. 2).

If there is not another paper feed tray 232 holding the matching paper (step S18 in FIG. 2: No), the controller 21 prompts the user to set paper in the paper feed tray 232 (step S19 in FIG. 2). More specifically, the controller 21 displays on the display panel of the user interface 22 a message prompting loading paper. Processing then returns to step S17.

However, if the decision is that there is another paper feed tray 232 holding the matching paper (step S18 in FIG. 2: Yes), or the decision in step S17 is that the paper feed tray 232 has not run out of paper (step S17 in FIG. 2: No), the process returns to step S14. The process then repeats until the print job ends.

If the process proceeds to step S21, the controller 21 executes the process for when the paper feeder is specified.

First, the controller 21 determines whether or not there is paper in the specified print media feeder 23 (tray 231, 232)

(step S21 in FIG. 2). As described above, this decision is based on output from a sensor (sensor 26 or other).

If the decision is there is no paper (step S21 in FIG. 2: No), the controller 21 prompts the user to put paper in a tray (step S22 in FIG. 2). More specifically, the controller 21 displays on the display panel of the user interface 22 a message prompting adding paper. The process then returns to step S21.

However, if there is paper (step S21 in FIG. 2: Yes), the controller 21 supplies paper from the specified tray (step S23 in FIG. 2), controls the print mechanism. 24 to convey the supplied paper to the printing position, executes the printing process (step S24 in FIG. 2), and then discharges the printed paper.

The controller 21 then determines if the print job was completed (step S25 in FIG. 2), and if the print job was completed (step S25 in FIG. 2: Yes), stops printing based on the received print request data.

If the print job is not completed (step S25 in FIG. 2: No), the process returns to step S21. The process then repeats until the print job is completed.

The printer 2 thus processes print request data as described above.

The printer 2 according to this embodiment can change (set) enabling and disabling (turning on/off) the manual feeder priority function. To change the setting, the user issues a command from the user interface 22. When the manual feeder priority function is disabled (off) and automatic paper feeder selection is specified, paper is supplied not from the manual feed tray 231 but from the paper feed tray 232 matching the printing conditions.

The printer 2 in this example has a user interface 22, but when the manual feeder priority function is provided in a printer 2 that does not have a user interface 22, the printer 2 operates as though the manual feeder priority function is enabled because the user cannot switch the manual feeder priority function between enabled and disabled.

As described above, a printer 2 according to this embodiment of the invention has a manual feeder priority function, and if automatic paper feeder selection is commanded in the received print request, printing proceeds with paper feed from the manual feed tray 231 prioritized. In a work environment where the manual feed tray 231 is frequently used, such as in teller work where passbooks are frequently printed, there is no need to select (specify) the paper feeder every time the manual feed tray 231 is used, and user convenience is improved.

When automatic paper feeder selection is specified and the manual feeder priority function is enabled, paper is supplied from the manual feed tray 231 if the sensor 26 for the manual feed tray 231 detects paper in the manual feed tray 231, but if the sensor 26 for the manual feed tray 231 detects there is no paper in the manual feed tray 231, paper is supplied from another suitable paper feed tray 232. Printing therefore proceeds using the appropriate paper when there is no paper in the manual feed tray 231, and user convenience is again improved.

Furthermore, if the sensor 26 detects there is no paper in the manual feed tray 231 and suitable paper is also not loaded in another paper feed tray 232, the user is prompted to select a paper feeder and printing proceeds with paper supplied from the selected paper feeder. Therefore, when a paper matching error occurs, printing can still be completed using the paper desired by the user.

When the sensor 26 detects there is no paper in the manual feed tray 231, and processing goes to the normal process executed with automatic paper feeder selection, paper is supplied from another paper feed tray 232 holding the same type of paper when the paper feed tray 232 that was supplying paper runs out of paper. As a result, the need for the user to add paper to complete the print job is eliminated, and user convenience is further improved.

The user can also turn the manual feeder priority function on or off (enabled or disabled) to use the setting appropriate to the work environment. For example, when the printer is used by a user near the printer and a user at a remote location, the manual feeder priority function is preferably turned off.

When the manual feeder priority function is enabled, the printer determines whether or not to use the manual feeder priority function based on the type of job in the received print request. For example, when printing a received fax, or printing a status report, the manual feeder priority function is not used. This is because these applications usually do not print to paper set in the manual feed tray 231.

The CPU as referred to herein may be embodied by one or multiple CPUs, or by one or multiple other integrated circuit devices, such as ASIC chips. The CPU may also be embodied by a combination of one or multiple CPUs and one or multiple other integrated circuit devices.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2018-036221, filed Mar. 1, 2018 is expressly incorporated by reference herein.

What is claimed is:

1. A printer configured to print based on print request data, comprising:
   a manual paper feeder from which only one sheet of print media can be loaded at one time;
   another paper feeder from which multiple sheets of print media can be loaded at one time;
   a memory configured to store a setting of whether a manual feeder priority function is enabled or disabled;
   a controller configured to
      receive print request data including a command specifying a paper feeder,
      interpret the command in the print request data, and
      determine the paper feeder that is to supply printing media; wherein
         when the controller receives the print request data, the controller interprets the command and determines whether an automatic paper feeder selection is specified,
         when the automatic paper feeder selection is specified, the controller determines whether or not the manual feeder priority function is enabled, and
         when the manual feeder priority function is enabled, the controller supplies the printing media from the manual paper feeder.

2. The printer described in claim 1, further comprising:
   a sensor configured to detect presence of paper in the manual paper feeder;
   when automatic paper feeder selection is specified in the print request data, the controller determines whether or not paper is in the manual paper feeder based on a detection result of the sensor, and if paper is detected, the controller supplies paper from the manual paper feeder for printing.

3. The printer described in claim 2, wherein:
when the controller determines whether or not paper is in the manual paper feeder based on the detection result of the sensor, and determines there is no paper, the controller supplies paper for printing from another paper feeder in which paper matching the print request data is set.

4. The printer described in claim 3, wherein:
the another paper feeder includes multiple paper feeders; and
when the paper feeder runs out of paper while executing a print job supplying the printing media from one of the multiple other paper feeders, the controller executes the print job by supplying the printing media from one of the multiple other paper feeders that holds the printing media matching the print request data and is not the paper feeder that ran out of paper.

5. The printer described in claim 2, wherein:
when paper is not set in the manual paper feeder, and paper matching the print request data is not set in another paper feeder, the controller prompts selecting the manual paper feeder or another paper feeder.

6. The printer described in claim 2, wherein:
when the manual paper feeder runs out of paper while executing a print job supplying paper from the manual paper feeder, the controller prompts setting the printing media in the manual paper feeder, and does not execute the print job by supplying the printing media from another paper feeder.

7. The printer described in claim 1, further comprising:
a user interface configured to control interfacing with a user of the printer, wherein:
the manual feeder priority function is configured to be set to enabled or disabled by the user interface.

8. The printer described in claim 7, wherein:
when the manual feeder priority function is enabled, whether or not to use the manual feeder priority function is determined based on a type of print job specified by the print request data.

9. The printer described in claim 8, wherein:
the manual feeder priority function is used when the print job is in response to a request from an external device, and the manual feeder priority function is not used when the print job is printing a facsimile or printing a status report.

10. A non-transitory computer-readable recording medium in which a program is recorded, the program causing a controller of a printer configured to print based on print request data, and having a manual paper feeder from which only one sheet of print media can be loaded at one time, and another paper feeder from which multiple sheets of print media can be loaded at one time, to execute a process of:
storing a setting of whether a manual feeder priority function is enabled or disabled;
receiving the print request data including a command specifying a paper feeder; and
interpreting the command in the print request data; wherein
when the automatic paper feeder selection is specified, the controller determines whether or not the manual feeder priority function is enabled, and
when the manual feeder priority function is enabled, the controller supplies the printing media from the manual paper feeder.

* * * * *